United States Patent [19]
Taniguchi et al.

[11] Patent Number: 5,660,510
[45] Date of Patent: Aug. 26, 1997

[54] SPINDLE DEVICE

[75] Inventors: Katsuji Taniguchi; Shigeru Yamada, both of Takaoka, Japan

[73] Assignee: Kitamura Machinery Co., Ltd., Japan

[21] Appl. No.: 545,727

[22] PCT Filed: Dec. 21, 1994

[86] PCT No.: PCT/JP94/02171

§ 371 Date: Nov. 2, 1995

§ 102(e) Date: Nov. 2, 1995

[87] PCT Pub. No.: WO95/29038

PCT Pub. Date: Nov. 2, 1995

[30] Foreign Application Priority Data

Apr. 20, 1994 [JP] Japan ................................. 6-104287

[51] Int. Cl.⁶ ..................................................... B23Q 11/10
[52] U.S. Cl. .......................... 409/136; 408/56; 409/137; 409/233
[58] Field of Search ........................ 409/135, 136, 409/137, 231, 233; 408/56, 57, 60, 61

[56] References Cited

U.S. PATENT DOCUMENTS

| 4,951,578 | 8/1990 | von Haas et al. | 408/56 |
| 5,039,261 | 8/1991 | Takada | 409/233 |
| 5,174,692 | 12/1992 | Martin | 408/56 |

FOREIGN PATENT DOCUMENTS

| 3320873 | 12/1984 | Germany | 409/137 |
| 3423060 | 1/1986 | Germany | 409/233 |
| 3512890 | 10/1986 | Germany | 409/233 |
| 9827 | 3/1974 | Japan | 409/137 |
| 54-114878 | 9/1979 | Japan . | |
| 63-212438 | 9/1988 | Japan . | |
| 5-26246 | 4/1993 | Japan . | |
| 5-44406 | 6/1993 | Japan . | |
| 6-254740 | 9/1994 | Japan . | |

*Primary Examiner*—Daniel W. Howell
*Attorney, Agent, or Firm*—Ronald P. Kananen

[57] ABSTRACT

A spindle device in which a coolant passage 26, capable of being selectively connected to a main passage 17, is provided at downstream of the main passage 17, an air passage 32, capable of being selectively connected to the main passage 17, is provided externally of the coolant passage 26, a first open-close means 20 is provided between the main passage 17 and the coolant passage 26, and a second open-close means 30 is provided between the main passage 17 and the air passage 32, whereby when the tool is clamped, the first open-close means 20 is opened to connect the main passage 17 with the coolant passage 26 and the second open-close means 30 is closed to cut-off the connection between the main passage 17 and the air passage 32 whereas when the tool is unclamped, the first open-close means 20 is closed to intercept the connection between the main passage 17 and the coolant passage 26 and the second open-close means 30 is opened to connect the main passage 17 with the air passage 32.

8 Claims, 4 Drawing Sheets

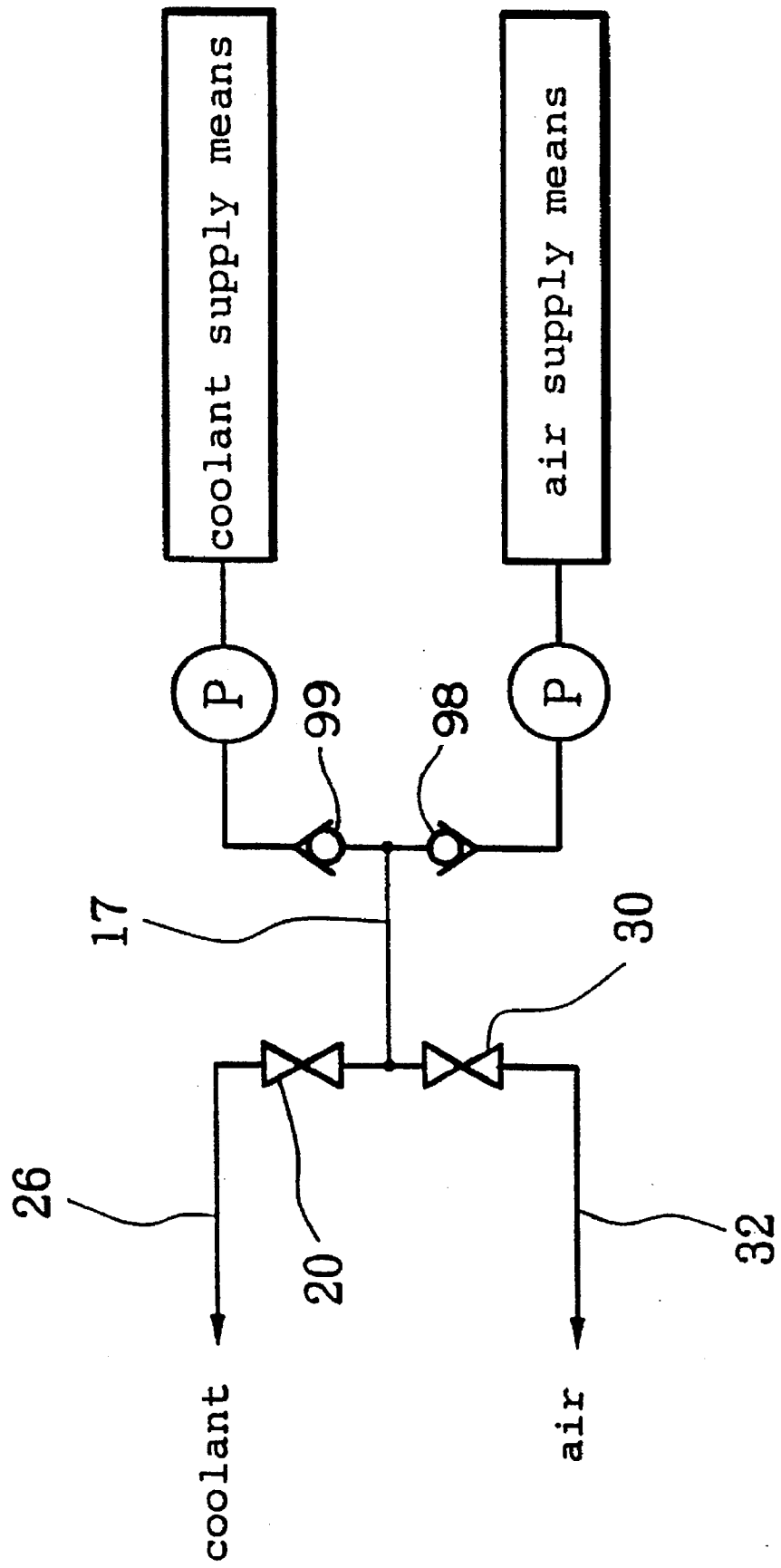

0
SPINDLE DEVICE

TECHNICAL FIELD

This invention relates to a spindle device which is so designed that a drawing bolt is moved to clamp and unclamp a tool, and a coolant is supplied through a main passage provided along a diametrically central part of the drawing bolt.

BACKGROUND ART

Japanese Patent Laid-Open Publication No. 54-114878 discloses a coolant supply device in which a coolant and air is supplied through a through-hole provided in a drawing bolt.

A coolant is supplied to a tool and a work during working to provide a cooling action, an abrasion preventive action and the like. On the other hand, air is supplied when the tool is unclamped to prevent chips or the like from adhering to a shank portion of a tool holder and a tool holder support portion of a spindle, thus enhancing the mounting accuracy of the tool.

In the aforementioned coolant supply device, the through-hole through which a coolant and air are supplied is used in common over the whole channel. An outlet is also used in common, and both the coolant and air are discharged out of the common outlet on the diametrically central part.

A hole for allowing a coolant to flow is provided on the diametrically central part of the tool holder, and the coolant moved out of the outlet is supplied to the tool and the work through the hole of the tool holder. The air as well as the coolant are discharged along the diametrically central part from the common outlet.

The shank portion of the tool holder and the tool holder support portion of the spindle to be cleaned are not present on the diametrically central part but are spread on the circumference encircling the diametrically central part. Because of this, it sometimes occurred that the cleaning operation by way of air discharged is not sufficient so that a improper setting of the tool is brought forth.

SUMMARY OF THE INVENTION

In view of the problem as noted above with respect to prior art, it is an object of the present invention to provide a spindle device which can selectively supply a coolant and air and can efficiently clean a tool holder shank portion with air.

The present invention provides a spindle device in which a drawing bolt is moved to clamp and unclamp a tool, and a coolant is supplied through a main passage provided on a diametrically central part of the drawing bolt. This arrangement is characterized in that a coolant passage 26, capable of being selectively connected to a main passage 17, is provided at downstream of the main passage 17, an air passage 32, capable of being selectively connected to the main passage 17, is provided externally of the coolant passage 26. A first open-close means 20 is provided between the main passage 17 and the coolant passage 26, and a second open-close means 30 is provided between the main passage 17 and the air passage 32, whereby, when the tool is clamped, the first open-close means 20 is opened to connect the main passage 17 with the coolant passage 26 and the second open-close means 30 is closed to cut-off the connection between the main passage 17 and the air passage 32 whereas when the tool is unclamped, the first open-close means 20 is closed to cut-off the connection between the main passage 17 and the coolant passage 26 and the second open-close means 30 is opened to connect the main passage 17 with the air passage 32.

BRIEF DESCRIPTION OF THE DRAWINGS

FIG. 4 is a block diagram showing a flow of a coolant and air in the spindle device of FIG. 1.

DETAILED DESCRIPTION OF THE PREFERRED EMBODIMENTS

Figure 1:
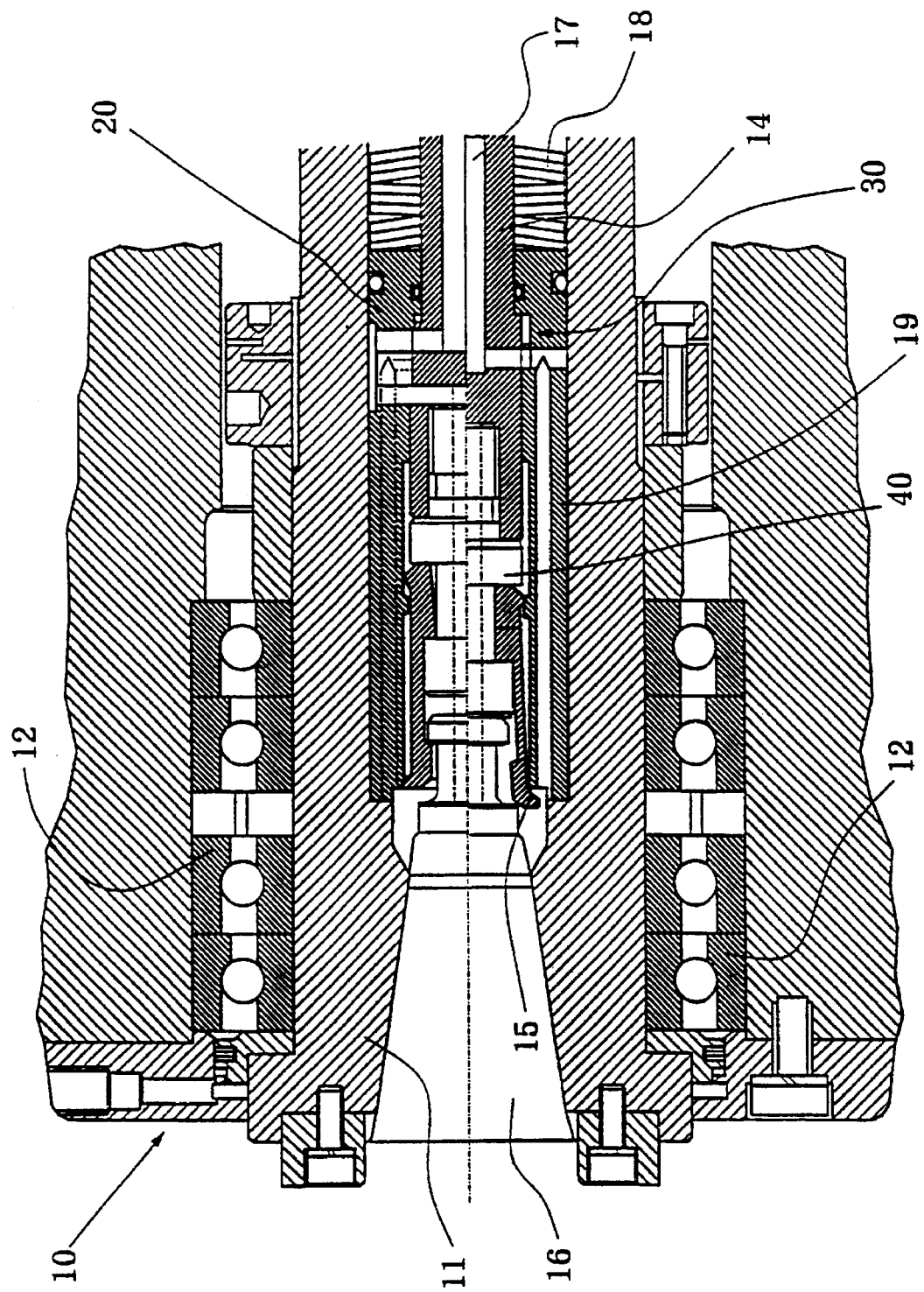
FIG. 1 is a sectional view showing main portions of a spindle device according to the present invention, an upper side of a center line showing a clamped state whereas a lower side thereof showing an unclamped state.

When a drawing bolt (bar) is actuated to clamp a tool, a first open-close means 20 is opened and a second open-close means 30 is closed. That is, a coolant passage 26 is connected with a main passage 17, and a connection between the main passage 17 and an air passage 32 is interrupted (cut-off). At that time, a coolant can be supplied through the main passage 17 and the coolant passage 26 to work a work.

When the tool is unclamped upon termination of working, the first open-close means 20 is closed, and the second open-close means 30 is opened. That is, the coolant passage 26 is closed to communicate the main passage 17 with the air passage 32. Then, particularly, if air is supplied through the main passage 17 and the air passage 32 immediately before a new tool is clamped, a shank portion of a tool holder and a tool holder support portion of a spindle can be effectively cleaned.

Figure 2:
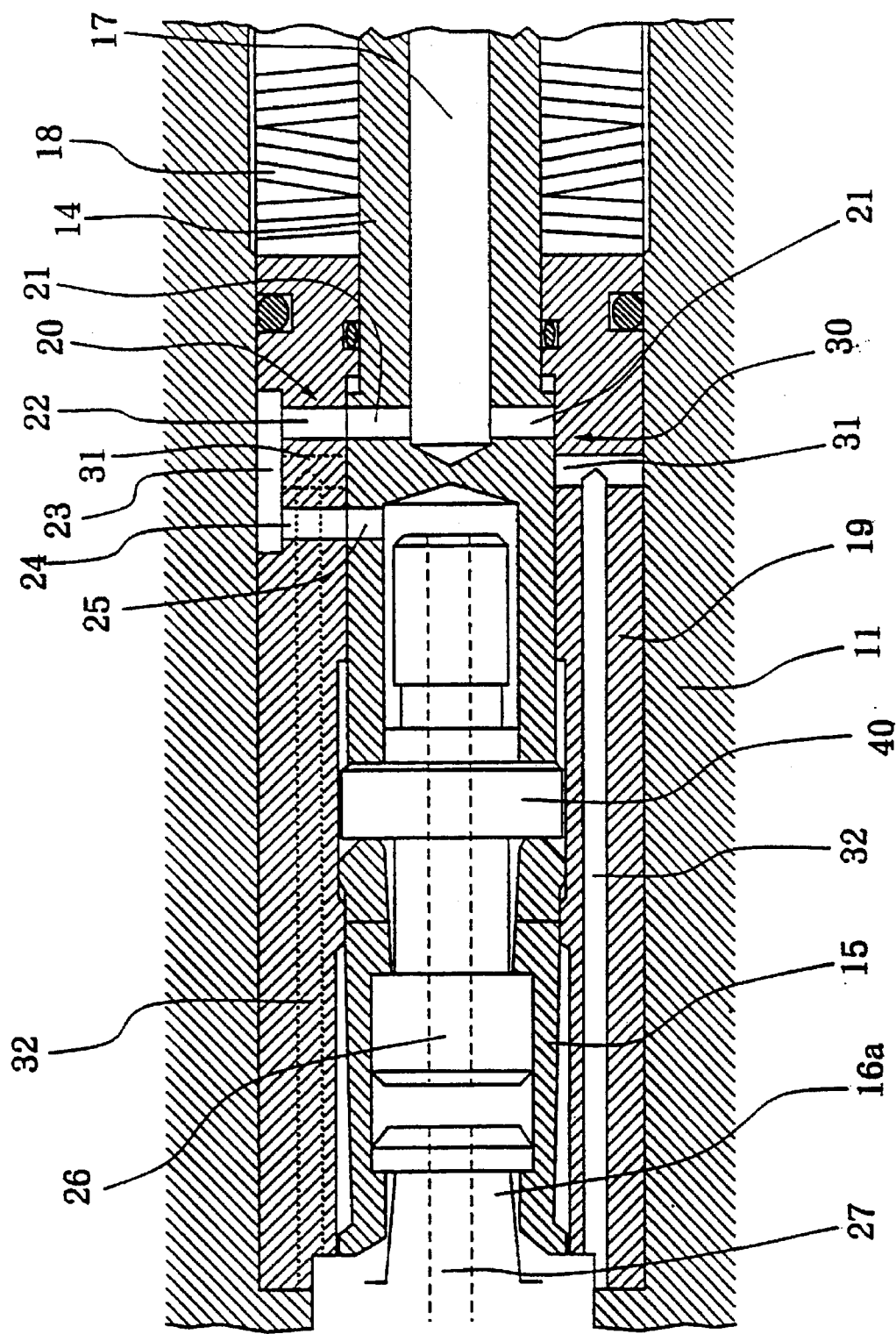
FIG. 2 is an enlarged sectional view showing the clamped state of the spindle device of FIG. 1.
Figure 3:
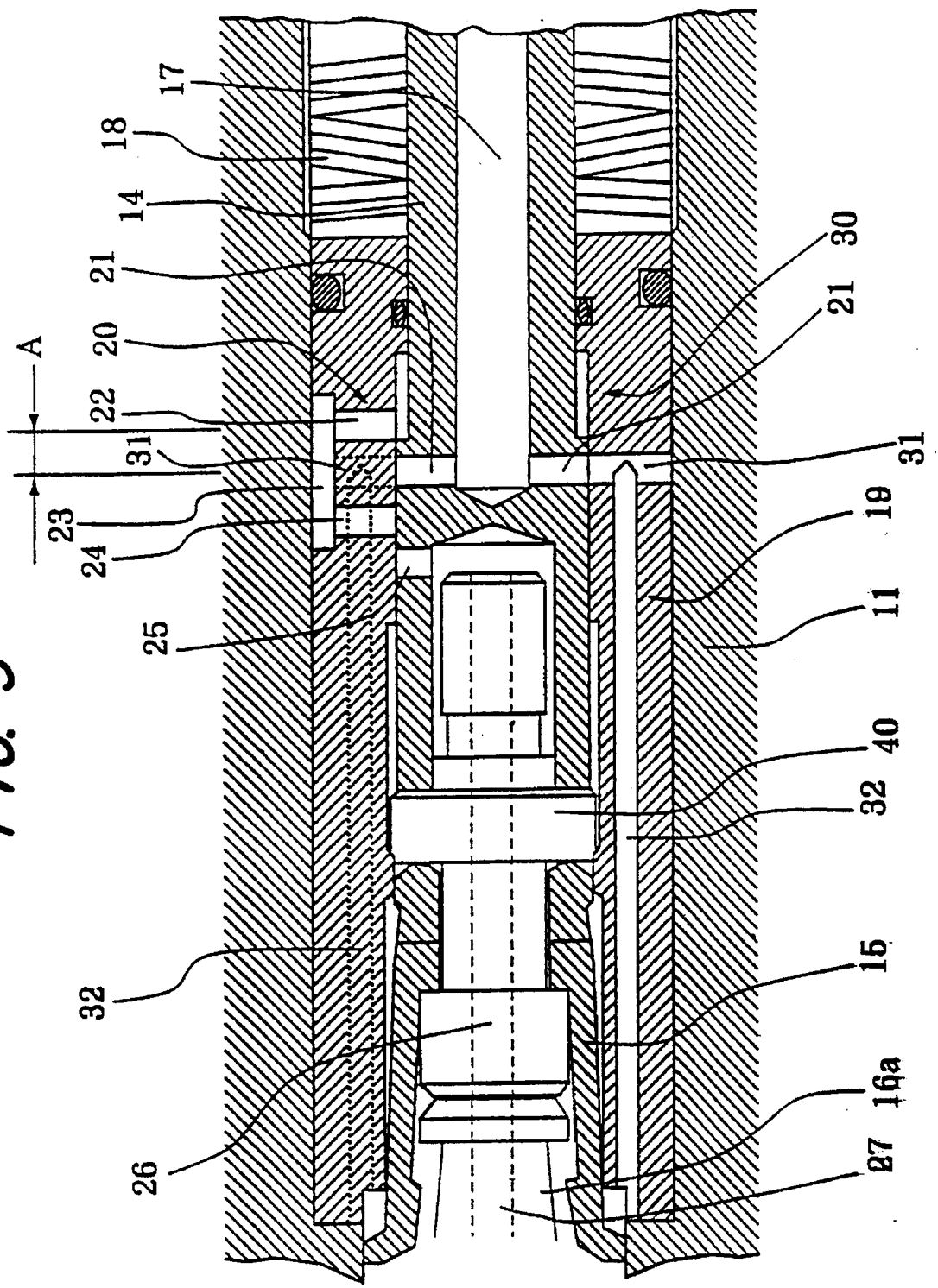
FIG. 3 is an enlarged sectional view showing the unclamped state of the spindle device of FIG. 1.

An embodiment of the present invention will be described hereinafter with reference to the drawings. FIG. 1 is a sectional view showing main portions of a spindle device according to the present invention, an upper side of a center line showing a clamped state whereas a lower side thereof showing an unclamped state. FIGS. 2 and 3 are enlarged sectional views showing a part of the spindle device in the clamped state and the unclamped state, respectively. FIG. 4 is a block diagram showing a flow of a coolant and air.

A spindle device 10 according to the present invention has the characteristic in a supply system of a coolant and air, and as to other structures, a structure of a spindle device in a normal machining center can be employed without modification. Accordingly, a description will be made below putting stress on the coolant and air supply system.

The spindle device 10 is provided with a spindle 11 which can be driven at high speeds. The spindle 11 is installed in a housing 13 through a bearing 12.

The spindle 11 has a through-hole on the diametrically central part thereof, at the end of which is formed a tapered portion for supporting a tool holder. A drawing bolt (which is also called a drawing bar) 14 is inserted into the through-hole. A number of plate springs 18 are inserted in a space between the spindle 11 and the drawing bolt 14. The plate springs 18 press the drawing bolt 14 backward.

A main passage 17 is provided on the diametrically central part of the drawing bolt 14, at an upstream end (not shown) of which are connected in parallel a coolant supply means and an air supply means (see FIG. 4 for both the means). The downstream end of the main passage 17 terminates halfway of the drawing bolt 14. At the rear of the drawing bolt 14, there is provided a mechanism (not shown) for extruding the drawing bolt 14 against the force of the plate springs 18. It is to be noted that preferably, check valves 98 and 99 as shown in FIG. 4 are arranged at the rear of the main passage.

To the end of the drawing bolt 14 is connected an inner sleeve 40 which is tubular wholly and whose intermediate portion is large in diameter. A collet 15 for gripping a tool holder 16 is supported at the end of the inner sleeve 40. A coolant passage 26 is formed on the diametrically central part of the inner sleeve 40. The coolant passage 26 is positioned on an extending line of the main passage 17 but both the passages are not directly communicated and can be selectively communicated through a first valve 20 which will be described later.

In the vicinity of the downstream end of the main passage 17, valve passages 21 and 29 leading to the outer periphery of the drawing bolt 14 are formed in a radial direction. A similar valve passage 25 is formed at a predetermined distance ahead of the valve passage 21, the valve passage 25 being communicated with the coolant passage 26.

An outer sleeve 19 which is longer than the inner sleeve 40 is disposed externally of the inner sleeve 40. The outer sleeve 19 is positioned within the through-hole of the spindle and extends from the end of the plate springs 18 to the tapered portion of the spindle. Internally of the outer sleeve 19 are axially slidably arranged an end of the drawing bolt 14, the inner sleeve 40 and the collet 15. When the drawing bolt 14 and the collet 15 are moved forward by a stroke width A from the clamped state shown in FIG. 2, the end of the collet 15 is opened as shown in FIG. 3 to assume the unclamped state.

A first valve 20 as an open close means is disposed between the main passage 17 and the coolant passage 26, and a second valve 30 as an open-close means is likewise disposed between the main passage 17 and the air passage 32.

The first valve 20 is opened when the tool is clamped to connect the main passage 17 with the coolant passage 26. At that the, the second valve 30 becomes closed to intercept the connection between the main passage 17 and the air passage 32.

On the other hand, when the tool is unclamped, the first valve 20 is closed to intercept the connection between the main passage 17 and the coolant passage 26. At that time, the second valve 30 is opened to connect the main passage 17 with the air passage 32.

The first and second valves 20 and 30 will be described in detail hereinafter.

The first valve 20 is constituted by valve passages 21 to 25. The valve passage 21 is the passage formed radially toward the outer periphery of the drawing bolt 14 from the main passage as previously mentioned. The valve passages 22 to 24 are intermediate passages provided in the outer sleeve 19, the three passages 22 to 24 being communicated. The valve passage 22 is arranged so that the former can be communicated with the valve passage 21. The valve passage 25 is parallel with the valve passage, as previously mentioned, and is communicated with the coolant passage 26 of the inner sleeve 40. The distance between the valve passages 21 and 25 is equal to that between the valve passages 22 and 24. Accordingly, when the valve passages 21 to 25 are communicated and the first valve is opened, the main passage 17 is connected with the coolant passage 25.

The second valve 30 is constituted by plural sets of valve passages 29 and 31. The valve passage 29 is positioned within the same plane as the valve passage 21 of the first valve 20, and is formed radially toward the outer periphery of the drawing bolt 14 from the main passage 17, as previously mentioned. The valve passage 31 is the passage formed radially in the outer sleeve 19. The valve passage 31 is arranged so that the former can be communicated with the valve passage 29. In the FIG. 3 state, both the valve passages 29 and 31 are deviated by the distance A in an axial direction and are not communicated. If the drawing bolt 15 is moved forward by the distance A to unclamp the tool, both the valve passages 29 and 31 are placed in communication with each other so that the second valve 30 assumes the connected state (see FIG. 3).

The valve passage 31 is communicated with the air passage 32 formed in the outer sleeve 19. The air passage 32 extends from the valve passage 31 to an air discharge port 41 at the front end of the outer sleeve 19. For example, eight air passages 32 can be provided at equal intervals in the circumferential direction, the number thereof being optional.

Next, the operation of supplying the coolant and air in the spindle device 10 will be explained.

As shown in FIG. 2, when the tool is clamped, the valve passages 21 to 25 are communicated so that the first valve 20 is opened. Accordingly, the coolant can be supplied from a coolant supply source to the tool and work via the main passage 17 and the coolant passage 26. At that time, the second valve 30 is closed.

On the other hand, when the tool is unclamped as shown in FIG. 3, the valve passages 29 and 31 are placed in communication with each other so that the second valve 30 assumes the connected state. Accordingly, air can be supplied from an air supply source to the air discharge port 41 via the main passage 17 and the air passage 32. At that time, the first valve 20 assumes the closed state.

According to the spindle device of the present invention, when clamped, the work can be worked while supplying the coolant through the main passage 17 and the coolant passage 26. Further, when unclamped, air can be supplied through the main passage 17 and the air passage 32 to clean the shank portion of the tool holder and the tool holder support portion of the spindle. At this time, since the air passage 20 is arranged externally of the coolant passage 26, a flow of air is discharged from the outside position around the diametrically central part of the spindle. Accordingly, it is possible to effectively clean the shank portion of the tool holder and the support portion of the spindle which are circumferentially spread around the diametrically central part.

It is to be noted that the present invention is not limited to the aforementioned embodiments. For example, the air discharge port 41 can be formed in the entire circumference without substantial breaks. Further, the air passage can be formed and arranged so that air is discharged turning about the axis.

We claim:

1. A spindle device for supplying a coolant for cooling and an air for cleaning, comprising:

a rotatable spindle (11) having an axial hole, the axial hole having a taper portion at the front end thereof for receiving a tool holder (16);

a drawing bolt (14) slidably placed in the axial hole of the spindle (11) for clamping or unclamping the tool holder (16); (16), the drawing bolt (14) having a main passage (17) for supplying a coolant and an air;

a collet (15) attached to the drawing bolt (14) for gripping a pull stud (16a) of the tool holder a coolant passage (26) formed in the spindle (11) frontward of the main passage (17) for supplying a coolant, the coolant passage (26) being selectively connected to the main passage (17);

an air passage (32) formed in the spindle (11) externally of the coolant passage (26) for supplying air, the air passage (32) being selectively connected to the main passage (17), the air passage (32) having a front opening located near the peripheral front portion of the collet (15);

a first open-close means (20) provided between the main passage (17) and the coolant passage (26) for connecting the two passages (17, 26) when the tool holder (16) is clamped, while disconnecting the two passages (17, 26) when the tool holder is unclamped; and a second open-close means (30) provided between the main passage (17) and the air passage (32) for connecting the two passages (17,32) when the tool holder (16) is unclamped, while disconnecting the two passages (17, 32) when the tool holder (16) is clamped, wherein a coolant is supplied via the main passage and the coolant passage (26) when the tool holder (16) is clamped, while an air is supplied via the main passage (17) and the air passage (32) and is discharged from the front opening of the air passage (32) so as to be discharged directly to the taper portion of the tool holder (16) and the taper portion of the spindle (11) thereby improving a cleaning effect when the tool holder (16) is unclamped, wherein an outer sleeve (19) is placed in the axial hole of the spindle (11) in fixed relation thereto, the front portion of the drawing bolt (14) being slidably inserted in the outer sleeve (19), the air passage (32) being formed on the outer sleeve (19).

2. A spindle device according to claim 1, wherein a plurality of air passages (32) are formed at a same interval about a circumference of the sleeve (19).

3. A spindle device according to claim 1, wherein the air passage extends generally in the axial direction of the outer sleeve (19).

4. A spindle device according to claim 1, wherein the first open-close means (20) is a valve (20) which comprises valve passages (21–25) formed so as to align each other when a tool holder (16) is clamped and misalign each other when a tool holder (16) is unclamped.

5. A spindle device according to claim 4, wherein the valve passages (21–25) consist of a radial passage (22) formed on the drawing bolt (14) near the downstream end of the main passage (17), a radial passage (25) formed on the drawing bolt (14) near the upstream end of the coolant passage (26) at a distance from the radial passage (25), and intermediate passages (22–24) formed on the outer sleeve (19) and interconnecting the two radial passages (22, 25).

6. A spindle device according to claim 1, wherein the second open-close means (30) is a valve (30) which comprises two valve passages (29, 31) formed so as to align each other when a tool holder (16) is unclamped and misalign each other when a tool holder (16) is clamped.

7. A spindle device according to claim 6, wherein the two valve passages (29, 31) consist of a radial passage (29) formed on the drawing bolt (14) near the downstream end of the main passage (17), and a radial passage (31) formed on an outer sleeve (19) and connected to the air passage (32).

8. A spindle device for supplying a coolant for cooling and an air for cleaning, comprising:

a rotatable spindle (11) having an axial hole, the axial hole having a taper portion at the front end thereof for receiving a tool holder (16);

a drawing bolt (14) slidably placed in the axial hole of the spindle (11) for clamping or unclamping the tool holder (16), the drawing bolt (14) having a main passage (17) for supplying a coolant and an air;

a collet (15) attached to the drawing bolt (14) for gripping a pull stud (16a) of the tool holder (16);

a coolant passage (26) formed in the spindle (11) frontward of the main passage (17) for supplying a coolant, the coolant passage (26) being selectively connected to the main passage (17);

an air passage (32) formed in the spindle (11) externally of the coolant passage (26) for supplying air, the air passage (32) being selectively connected to the main passage (17), the air passage (32) having a front opening located near the peripheral front portion of the collet (15);

a first open-close means (20) provided between the main passage (17) and the coolant passage (26) for connecting the two passages (17, 26) when the tool holder (16) is clamped, while disconnecting the two passages (17, 26) when the tool holder (16) is unclamped; and a second open-close means (30) provided between the main passage (17) and the air passage (32) for connecting the two passages (17,32) when the tool holder (16) is unclamped, while disconnecting the two passages (17, 32) when the tool holder (16) is clamped, wherein a coolant is supplied via the main passage (17) and the coolant passage (26) when the tool holder (16) is clamped, while an air is supplied via the main passage (17) and the air passage (32) and is discharged from the front opening of the air passage (32) so as to be discharged directly to the taper portion of the tool holder (16) and the taper portion of the spindle (11) thereby improving a cleaning effect when the tool holder (16) is unclamped; and wherein check valves (98, 99) are provided, respectively, between, the air supply means and the main passage (17), and between the coolant supply means and the main passage (17).

* * * * *